United States Patent [19]
Davis

[11] Patent Number: 5,515,934
[45] Date of Patent: May 14, 1996

[54] AGILE VERSATILE MOBILE ROBOT BODY

[76] Inventor: Stuart D. Davis, 980 Kiely Blvd. #215, Santa Clara, Calif. 95051

[21] Appl. No.: 323,760

[22] Filed: Oct. 17, 1994

[51] Int. Cl.$^6$ ................................................. B62D 57/024
[52] U.S. Cl. ............................... 180/8.2; 901/1; 901/50; 180/15
[58] Field of Search ........................... 180/8.1, 8.2, 8.3, 180/8.5, 8.7, 15, 209, 6.2; 901/1, 48, 50; 296/193, 196, 197

[56] References Cited

U.S. PATENT DOCUMENTS

| | | | |
|---|---|---|---|
| 4,033,068 | 7/1977 | Skillman | 46/1 L |
| 4,993,912 | 2/1991 | King et al. | 414/729 |
| 5,248,008 | 9/1993 | Clar | 180/8.7 X |
| 5,293,107 | 3/1994 | Akeel | 901/25 X |
| 5,350,033 | 9/1994 | Kraft | 901/1 X |
| 5,377,106 | 12/1994 | Drunk et al. | 180/169 X |

FOREIGN PATENT DOCUMENTS

| | | | |
|---|---|---|---|
| 0194171 | 11/1982 | Japan | 180/8.2 |
| 0206930 | 12/1986 | Japan | 180/8.2 |
| 0026174 | 2/1987 | Japan | 180/8.2 |

OTHER PUBLICATIONS

"Go-For" Robot, 1991 NASA Planetary Rover Program by David Lavery & Roger J. Bedard, Jr. p. 3a.

*Primary Examiner*—Margaret A. Focarino
*Assistant Examiner*—Victor E. Johnson

[57] ABSTRACT

A modular robot body assembly includes a generally rhombicuboctahedron geometric shape segmented into five modules symmetrically located around a horizontal center shaft system which allows the robot body, front legs, and back legs to rotate about a horizontal center axis with respect to one another. Four quarter-shell modules are arranged at 90 degree angles from each other about the common horizontal center axis and joined at edges to each other and at their inner facing edges to a core module containing a shaft rotatably mounted along the horizontal center axis. Each module may contain functionally different parts that can be mixed and matched with other modules to suit particular applications. A flexible coil conduit is connected between the shaft and the core module providing an electrical linkage form the robot body to the legs while maintaining rotational capability of the legs with respect to the body.

12 Claims, 9 Drawing Sheets

AGILE VERSATILE MOBILE ROBOT BODY

BACKGROUND OF THE INVENTION

1. Field of the Invention

The present invention generally pertains to a mobile robot and more specifically to a mobile robot that has a geometrically symmetric modular body which has the agility and versatility to negotiate in a wide variety of applications utilizing front legs, back legs and body which independently rotate about a horizontal center axis.

2. Description of the Related Art

Currently mobile robots can be used in such mundane applications as floor polishing and vacuuming, to dangerous work such as cleanup of toxic waste, to exciting applications such as exploration of the moon and Mars. However, acceptance of mobile robots for the varied applications possible now and in the future is limited largely due to the high cost associated with development of such robots. Typically mobile robots are designed to do a specific task like those mentioned above. If another task is required, generally a new design is needed to accomplish the new task. This is an expensive approach. It is now appropriate that a more cost-conscious path be pursued. Robots intended for a variety of commercial applications will need compatibility of equipment and systems, as well as lower production costs, to make them economically feasible for use on a wide scale. This would be possible if a modular mobile robot body was available that was versatile and agile enough to adapt to new applications by combining the appropriate modules to accomplish the new task.

Attempts have been made to incorporate modularity into the design of mobile robots. Most of these designs simply start with a locomotion base at tile bottom of the robot and stack modules, one on top of the other, up from the base. This approach has limitations. The only direction for growth is up. The center of gravity becomes too high for many applications as more modules are added. The Nomad 200 by Nomadic Technologies, Inc. uses this approach, which is limited mainly to mobile robot research applications in a controlled environment on a flat surface. If robots are to be used in the real world they should be capable of navigating more than a flat surface in order to get to some of the placed they are needed, so agility is also a critical criterion for a useful mobile robot to possess.

Much effort has gone into making mobile robots agile enough to be used in environments humans and animals can navigate in with ease. Several designs incorporate some aspect of agility in them. U.S. Pat. No. 4,993,912 to King, Shackelord, and Kahl (1991) describes a robot which has the ability to climb stairs. The "Go-For" robot designed by NASA referred to in "1991 NASA PLANETARY ROVER PROGRAM" by David Lavery and Roger J. Bedard Jr. has the capability to maneuver into an upright position without assistance if it tips or gets knocked over. This is an important feature in some applications such as robotics exploration of the moon and Mars where physical assistance from man is not practical or possible. Rocky III also developed by NASA described in "1991 NASA PLANETARY ROVER PROGRAM" by David Lavery and Roger J. Bedard Jr. has the ability to traverse ragged terrain.

Another aspect relating to agility a robot needs is the ease at which the robots sensors and actuators can be maneuvered into positions for use. Currently mobile robots such as the robots referred to above have actuators and sensors located in specific location on the :front, back, bottom, and sides of the robot. Sometimes the same type of sensor or actuator is used in many different places because the robot is unable to maneuver that sensor into the other locations where use is desired. If the design of the mobile robot were such that actuators and sensors could be maneuvered more easily into other locations, this would cut down on duplication of sensors and actuators, which would cut down on weight and power consumption. A mobile robot body that shows increased agility and versatility over the prior art would have the ability to be used in a wider range of applications and, combined with a modular approach, would be more cost effective.

STATEMENT OF THE INVENTION

To avoid the limitations and problems with the present robot body types, it is therefore an object of the present invention to provide a robot body which achieves versatility by means of a modular construction.

It is a further object of the present invention to provide a robot body which incorporates symmetry and repetition in body modules, thus reducing manufacturing expense.

It is a further object of the present invention to provide a robot body which allows simple alteration of locomotion methods by changing a single module.

It is a further object of the present invention to provide a robot body which achieves agility by means of raising and lowering itself, thus changing its height, clearance, and center of gravity.

It is a further object of the present invention to provide a robot body which achieves agility by means of rotating itself about a horizontal center axis to change its center of gravity and to maneuver modules, actuators, and sensors into a particular position for use, and to maneuver under obstacles.

It is a further object of the present invention to provide a robot body which can travel up and down stairs.

It is a further object of the present invention to provide a robot body which can be joined to another robot body/bodies of like design to produce a larger robot body.

It is a further object of the present invention to provide a robot body which is able to get back on its wheels if it falls over, or gets knocked over.

The foregoing objectives and others of the present invention are provided by a novel modular robot body having a modified rhombicuboctahedron geometric shape symmetrically located around a horizontal center shaft system which allows the robot body, front legs, and back legs to rotate about the horizontal center axis with respect to one another. The use of the rhombicuboctahedron geometric shape has several advantages. The rhombicuboctahedron can be segmented into repeatable shaped modules, providing a reduction in manufacturing costs. These modules can be manufactured for different functions. For example, one module may contain a microprocessor unit, another batteries, or still another a mechanical arm. The rhombicuboctahedron has structural advantages similar to a geodesic dome shape, which acts to distribute a force applied to a point on the surface, and has an inherently low ratio of exposed external surface area to total volume, thus a reduction in material and weight is realized while maintaining durability. Because the rhombicuboctahedron is an extension of the cube, adapting conventional and commercially available electronic board shapes to fit in the modular volumes is simplified, as these products are generally designed to fit into rectangular type structures with sides at ninety degree angles to each other.

Alternatively, since the rhombicuboctahedron tends to be shaped more toward a sphere than a cube, other advantages are realized. For example, the many plane surfaces of the rhombicuboctahedron provides space for sensor placement to monitor the area around the robot in many directions. This provides a sensor field which has few blind areas in it. Also, in some cases, the modified rhombicuboctahedron body of the robot can act like a crude wheel to allow the body to roll along a surface achieving greater agility. This capability is also a result of the horizontal center shaft system which provides rotation of the body with respect to the legs. Because the horizontal center shaft system allows the robot body, front legs and back legs to rotate about the horizontal center axis, shifts in body height and placements are also possible, which also produces greater agility.

The foregoing objects and advantages of the present invention will become readily apparent to one of ordinary skill in the an after having read the following Detailed Description of the Preferred Embodiment which is illustrated in the various drawing figures.

DETAILED DESCRIPTION OF THE PREFERRED EMBODIMENT

Figure 1:
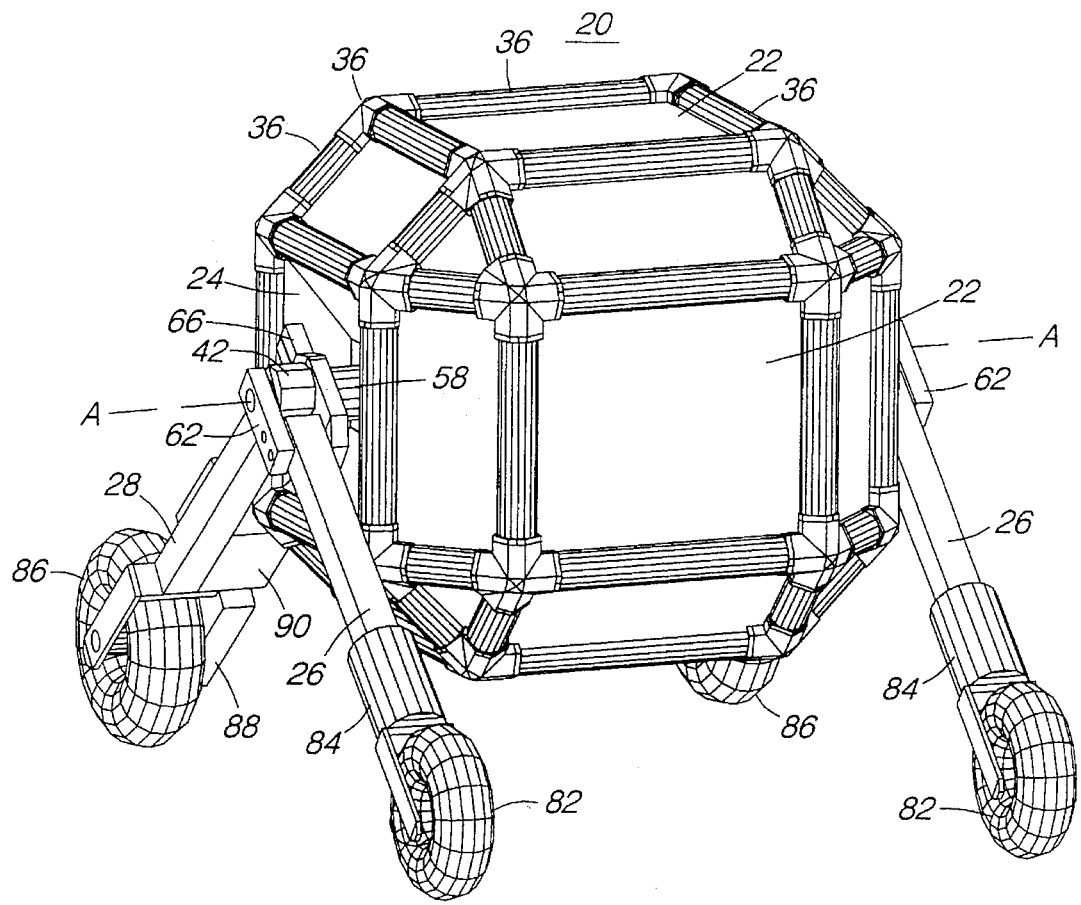
FIG. 1 is a perspective view of the preferred assembly of quarter-shell modules, core module, and legs which makes up the body of the mobile robot.
Figure 2:
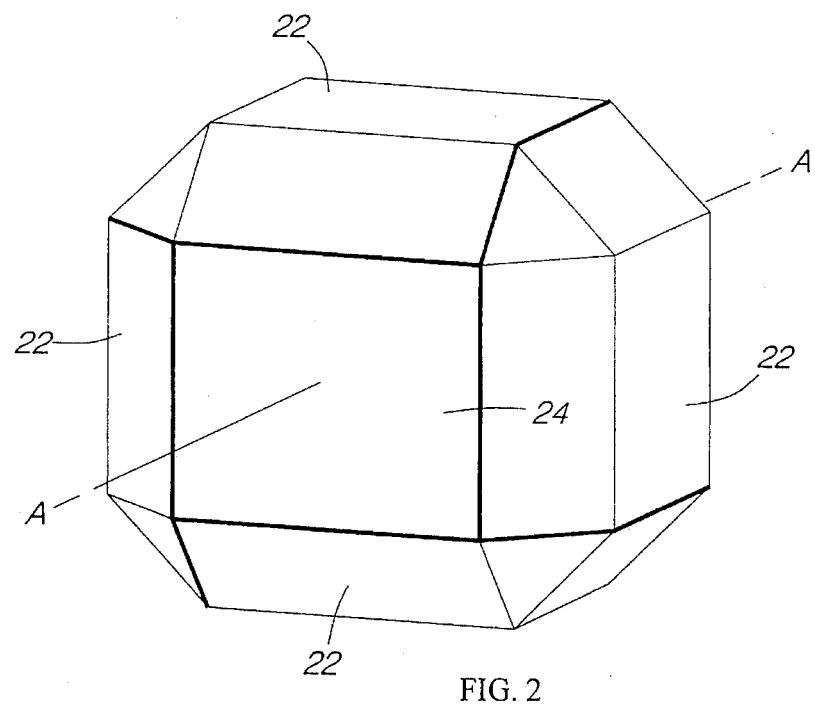
FIG. 2 is a perspective view of a simplified rendering of the preferred assembly of quarter-shell modules and core module excluding the legs to produce a modified rhombicuboctahedron.

In the preferred embodiment, a robot body referred to in FIGS. 1 and 2 by the general reference character 20 comprises the combination of quarter-shell panels or modules 22, core module 24, front legs or collar legs 26, and back legs or inner shaft legs 28. The combination of the quarter-shell modules 22, and core module 24 make up a modified rhombicuboctahedron geometric shape. This is a modified rhombicuboctahedron because the shape is not uniform in all three dimensions, but is longer in the dimension with the horizontal center axis A running through it. Also the external sides of the core module 24 that make up two sides of the rhombicuboctahedron are each made up of four planes that slant in toward the shaft for increased strength. To better see how the modular body parts are combined to produce the modified rhombicuboctahedron geometric shape, a simplified version of the preferred embodiment without legs is shown in FIG. 2. The quarter-shell modules 22 are arranged at 90 degree angles from each other about a common horizontal center axis A and joined at edges (depicted by wider lines in the drawing) to each other and at their inner facing edges to the core module 24. Each quarter-shell module 22 incorporates six exposed adjoining sides on the rhombicuboctahedron. The volume contained within each of the exposed sides and edges of each quarter-shell module 22 is generally considered part of the quarter-shell module 22. With each quarter-shell module 22 having six exposed sides and the rhombicuboctahedron having four quarter-shell modules 22, twenty four of the twenty six exposed sides are made by the four quarter-shell module combination. The remaining two opposite sides of the rhombicuboctahedron and the volume within these exposed sides and their edges generally make up the core module 24.

Figure 3:
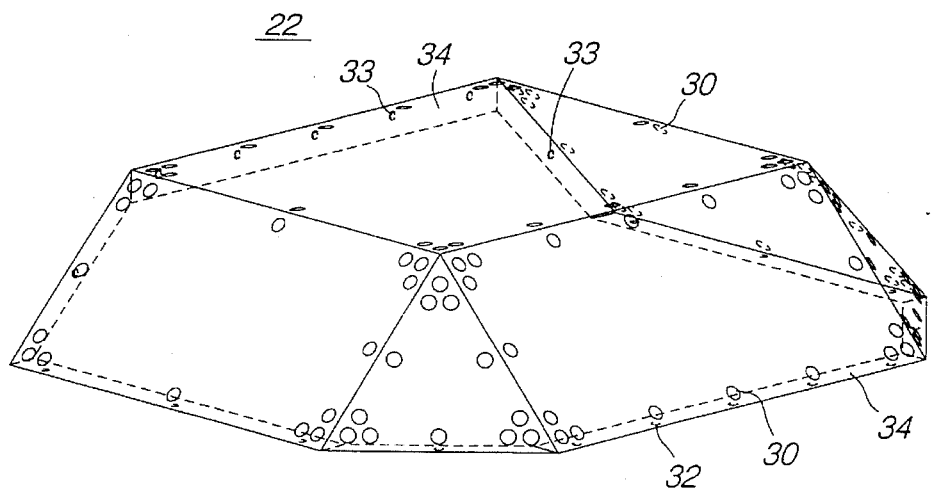
FIG. 3 is a perspective view of a quarter-shell module according to the teachings of the present invention.
Figure 4A:
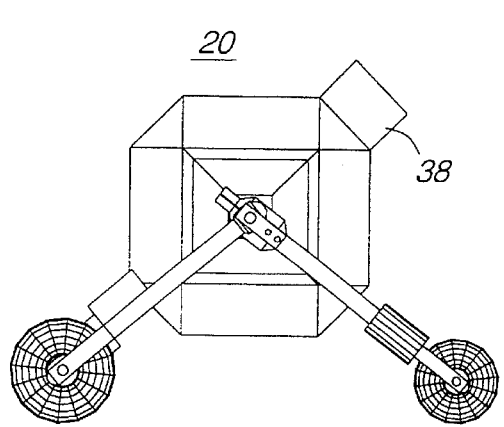
FIG. 4A is a side view of a simplified rendering of the body of the robot with a small trunk module attached to a quarter-shell module.
Figure 4B:
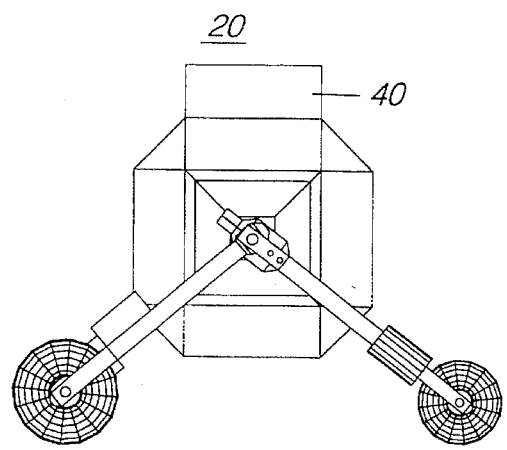
FIG. 4B is a side view of a simplified rendering of the body of the robot with a large trunk module attached to a quarter-shell module.

The quarter-shell module 22 may contain components different from another quarter-shell module to allow combinations of quarter-shell modules 22 to be arranged for specific applications, but their basic shape generally stays consistent with the rhombicuboctahedron geometry to allow connection to the other quarter-shell modules 22 and core module 24. FIG. 3 contains a detailed drawing of the preferred quarter-shell module 22. The quarter-shell module 22 contains three hole types: through holes 30 that reside along the intersection of surfaces, rim holes 32 that reside along the mating rim 34 that butts against other modules, and threaded holes 33 on the mating rim 34 that also butt against other modules. The through holes 30 just above the rim holes 32 allow placement of screws through and against the rim hole 32. The threaded holes 33 on one module line up with rim holes 32 of another module to allow modules to be held together by screws. The through holes 30 also hold robber bumpers 36 in place as shown in FIGS. 1 and 2, and also allows connection to another type of module shown in FIG. 4A and FIG. 4B called a small trunk segment 38 and a large trunk segment 40. Trunk segments can also be joined together in a stack fashion to each other to make longer trunk segment combinations.

Figure 5A:
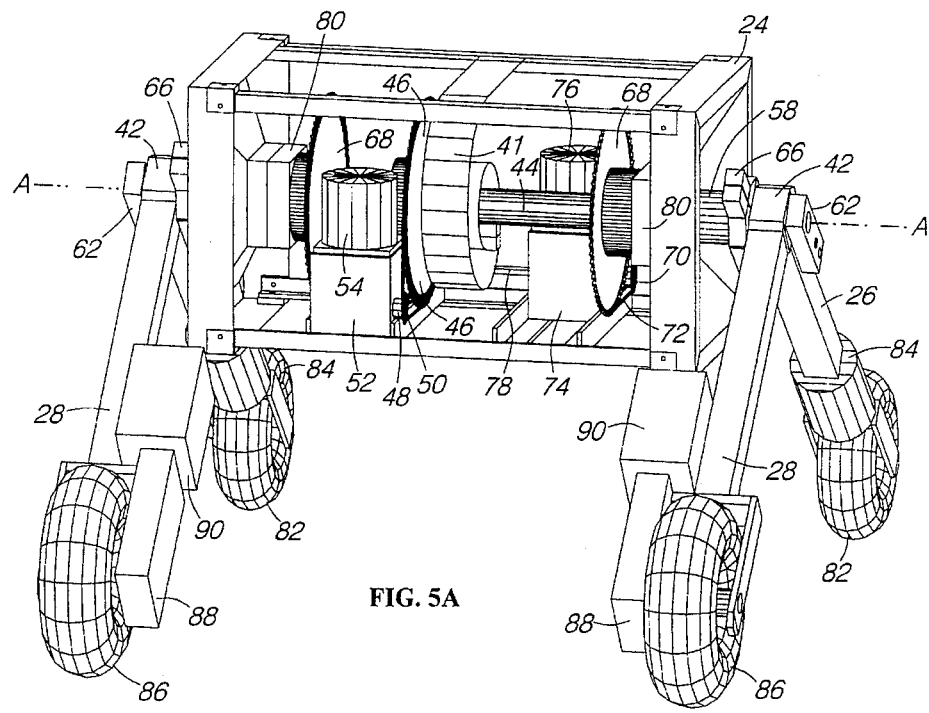
FIG. 5A is a perspective view of the core module according to the teachings of the present invention.
Figure 5B:
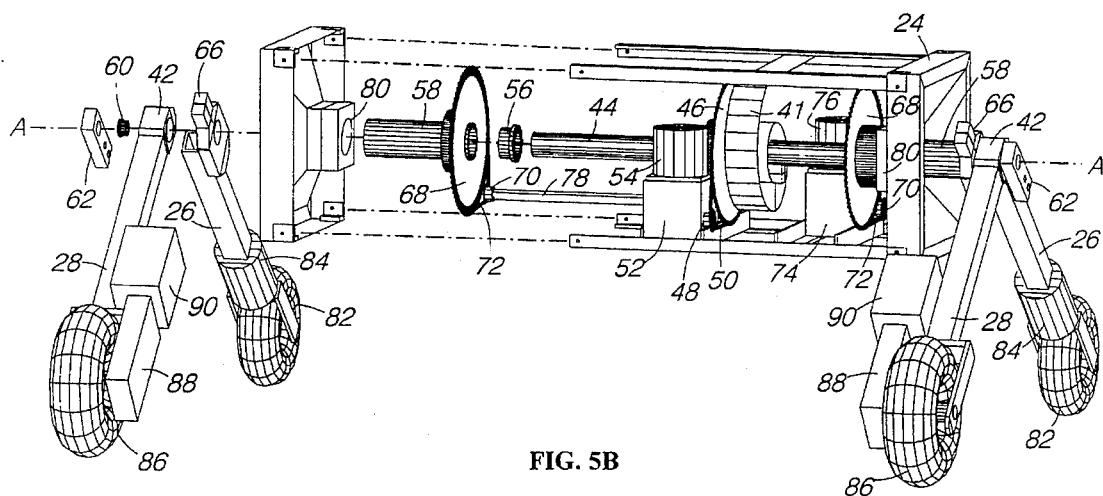
FIG. 5B is a perspective view of the core of FIG. 5A with one side exploded.

FIGS. 5A and 5B show drawings of the core module 24, collar legs 26, and inner shaft legs 28. The horizontal center shaft system is contained within the core module 24 as well as connecting to the collar leg 26, and inner shaft legs 28 on the exterior of the core module 24. The horizontal center shaft system is made up of an inner shaft drive linkage, a collar shaft drive linkage, and a flexible coil conduit 41.

The inner shaft drive linkage makes up a combination of two inner shaft leg brackets 42, a hollow inner shaft 44, a large inner shaft sprocket 46, a small inner shaft sprocket 48, an inner shaft chain 50, an inner shaft gear reducer 52, and an inner shaft motor 54. At the upper end of each inner shaft leg 28 a rigid connection is made with the inner shaft leg bracket 42. The inner shaft leg bracket 42 is rigidly connected to the inner shaft 44. The inner shaft 44 is supported by mid bearings 56 which rest against each collar shaft 58 and small bearings 60 which rest against each floating collar bracket 62. The inner shaft 44 is rigidly linked to the large inner shaft sprocket 46. The large inner shaft sprocket 46 is linked to the small inner shaft sprocket 48 by the inner shaft chain 50. The small inner shaft sprocket 48 is rigidly linked to the inner shaft gear reducer 52 and inner shaft motor 54.

The collar drive linkage makes up the combination of the collar shafts 58, fixed collar brackets 66, floating collar brackets 62, large collar shaft sprockets 68, small collar shaft sprockets 70, collar shaft chains 72, a collar shaft gear reducer 74, a collar shaft motor 76, and a long gear reducer shaft 78. The top of each collar leg 26 is rigidly connected to a fixed collar bracket 66 and floating collar bracket 62. Each fixed collar bracket 66 rigidly connects to a collar shaft 58. Each collar shaft 58 is supported by a large bearing 80. Each collar shaft 58 is rigidly linked to a large collar shaft sprocket 68. Each large collar shaft sprocket 68 is linked to a small collar shaft sprockets 70 by a collar shaft chain 72. Each small collar shaft sprocket 70 is rigidly linked to the collar shaft gear reducer 74 and collar shaft motor 76 by way of the long gear reducer shaft 78.

The bottom end of each of the collar legs 26 has a turning wheel 82 and turning motor 84 attached. At the end of each inner shaft leg 28 is a drive wheel 86 linked to a gear box 88 and drive motor 90.

The mode of operation of the horizontal center shaft system is as follows: The inner shaft and collar shaft drive linkages working alone or in combination with one another produce the rotation of the core module 24, collar legs 26, and inner shaft legs 28 with respect to each other. When electrical energy is applied to the collar shaft motor 76, the collar shaft drive linkage will produce rotation of the collar legs 26 with respect to the inner shaft legs 28 and core module 24 about the horizontal center axis A. When electrical energy is applied to the inner shaft motor 54, the inner shaft drive linkage will produce rotation of the inner shaft legs 28 with respect to the collar legs 26 and core module 24 about the horizontal center axis A. When electrical energy is applied to both collar and inner shaft motors 76, 54 so that the legs 26, 28 rotate in the same direction and rate, then the core module 24 will effectively rotate with respect to the collar legs 26 and inner shaft legs 28 about the horizontal center axis A.

The horizontal center shaft system also makes it possible to provide unexposed common electric, hydraulic, and/or pneumatic linkages to the legs 26, 28 for electronics, sensors and actuators that can be installed on the legs 26, 28 while maintaining rotational capability of the legs 26, 28. Because the collar legs 26 and inner shaft legs 28 pivot about the same horizontal center axis A, electrical cable and tubing to both collar legs 26 and inner shaft legs 28 can be provided through the inner shaft 44, which rotates about the horizontal center axis A. To maintain the rotational capability between the inner shaft 44 and core module 24, and also provide cable and tubing to pass between the inner shaft 44 and the core module 24, a flexible coil conduit 41 is connected between the inner shaft 44 and core module 24. The flexible coil conduit 41 is made of common ribbon cable fixed to a thin sheet of common flexible plastic. This will generally allow several hundred degrees of rotation between the inner shaft 44 and core module 24 before restriction occurs due to winding or unwinding of the flexible coil conduit 41. If unrestricted rotation between inner shaft 44 and the core module 24 is required, slip rings can replace the flexible coil conduit 41 for electrical transmission and a similar mechanical device can be used to transmit pneumatic and hydraulic energy.

Figure 6A:
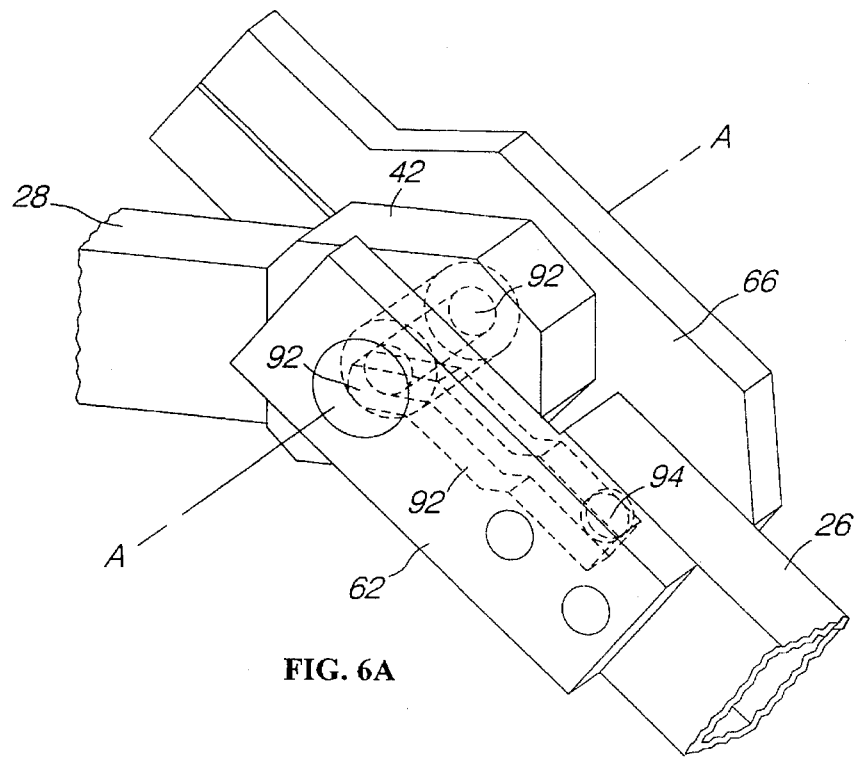
FIG. 6A is a perspective view with partial cutaway section of a portion of the horizontal center shaft system.
Figure 6B:
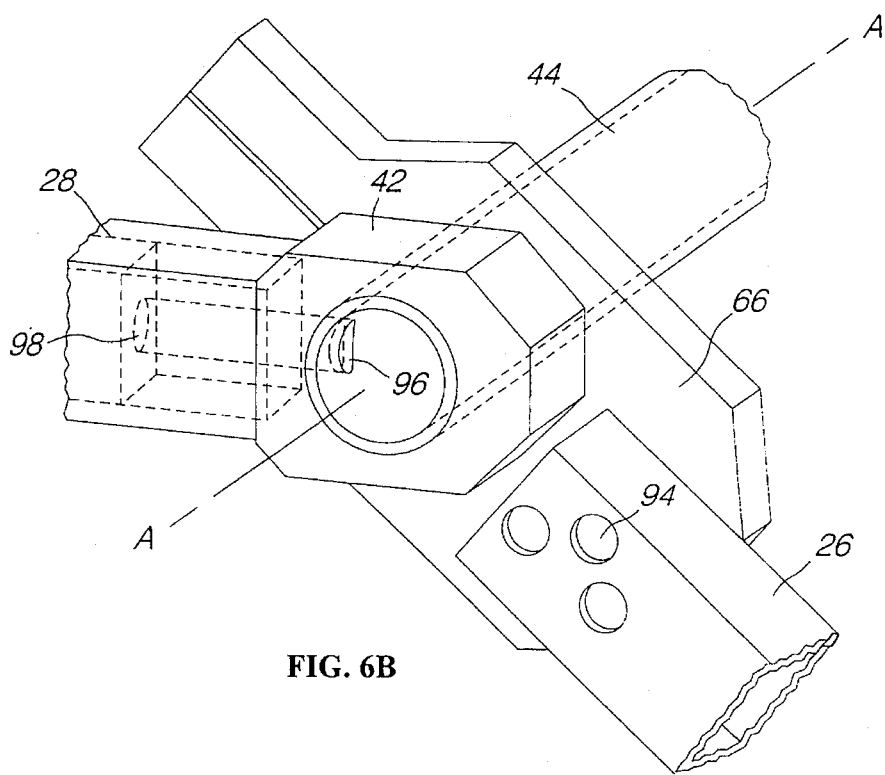
FIG. 6B is the view of FIG. 6A with one part removed.

The floating collar bracket 62 makes it possible to maintain the rotational capability of the inner shaft 44 and inner shaft legs 28 with respect to the collar shaft 58 and collar legs 26, while allowing the cable and tubing to pass unexposed from the inner shaft 44 out to the hollow of the collar leg 26. As can be seen in FIG. 6A, the floating collar bracket hollow space 92 provides a passage through the floating collar bracket 62 from the end of the inner shaft 44 to a collar leg hole 94 where the floating collar bracket 62 and collar leg 26 join. Because the floating collar bracket 62 allows cable and tubing to pass out the end of the inner shaft 44, cable and tubing can freely twist inside the inner shaft 44 to accommodate the rotation of the collar legs 26 with respect to the inner shaft legs 28. Any cable or tubing which needs to be routed to the inside of an inner shaft leg 28 from the inner shaft 44 is provided a hollow passage through an inner shaft hole 96 and an inner shaft leg bracket hole 98 as can be seen in FIG. 6B.

This horizontal center shaft system in conjunction with the rhombicuboctahedron geometry provides a symmetry that is responsible for lending this robot body 20 increased agility over the prior art. When the horizontal center shaft system rotates the legs 26, 24 in an opposite direction it has the effect of raising and lowering the robot body 20. When the horizontal center shaft system rotates the body, the quarter-shell modules 22 rotate into different positions which also has advantages. For example, in the arrangement where a CCD camera is mounted on a quarter-shell module 22, it is possible to maneuver the view of the camera to varying heights as well as an infinite number of directions vertically and horizontally. The ability of the robot body 20 to alter its height also permits clearance of obstacles when in a high position, as well as a lower center of gravity and better stability when in a low position.

Figure 7A:
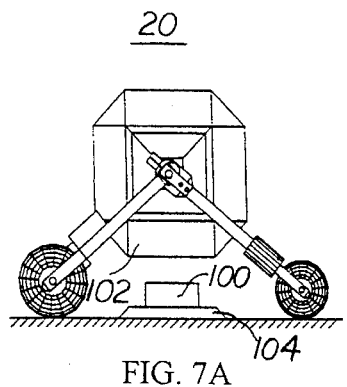
FIGS. 7A, 7B and 7C are side views of a simplified rendering of the robot body accepting a battery into one of its quarter-shell modules.
Figure 7B:
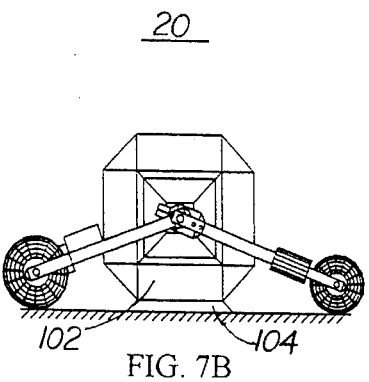
Figure 7C:
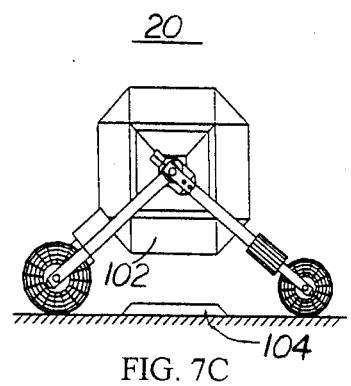

FIGS. 7A–7C show an example of the ability of the horizontal center shaft system in conjunction with the rhombicuboctahedron geometry to lower the robot body 20, enabling the robot body 20 to load and unload a battery unit 100 into and out of a battery quarter-shell module 102 from a recharge unit 104. The battery quarter-shell module 102 is designed to accept the shape of the battery unit 100 resting on a charge unit 104. FIG. 7A shows the robot body 20 in position ready to lower down over the battery unit 100. In FIG. 7B the robot body 20 is down onto the battery unit 100, accepting the battery unit 100 into the battery quarter-shell module 102. FIG. 7C shows the robot body 20 raised, having completed loading of the battery unit 100, and ready for use. By enabling the robot body 20 to unload a discharged battery unit 100 onto the recharge unit 104, and using a small backup battery located on the robot body 20 to provide energy to make the motions required to pick up a recharged battery off of another recharge unit, there is no need to have the robot body 20 sit idle while recharging.

Figure 8:
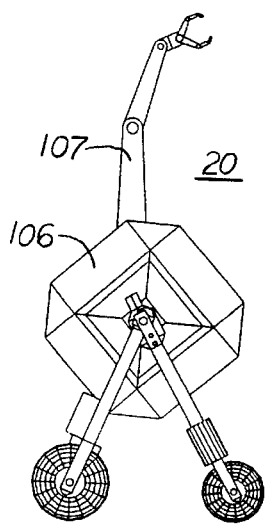
FIG. 8 is a side view of a simplified rendering, of the robot body in a close wheel base posture with an arm quarter-shell module attached and rotated to the top position with the arm outstretched.

In an arrangement where an arm quarter-shell module 106 is used as one of the modules on the robot body 20, the horizontal center shaft system in conjunction with the rhombicuboctahedron geometry gives the arm 107 a wide range of motion, as shown in FIG. 8. The wheel base is close together making the robot body 20 high, and the arm quarter-shell module 106 is rotated to the top position to achieve a high reach. It would also be possible to achieve a low reach down a hole for example, with the arm quarter-shell 106 rotated to the bottom position and wheel base widened.

Figure 9A:
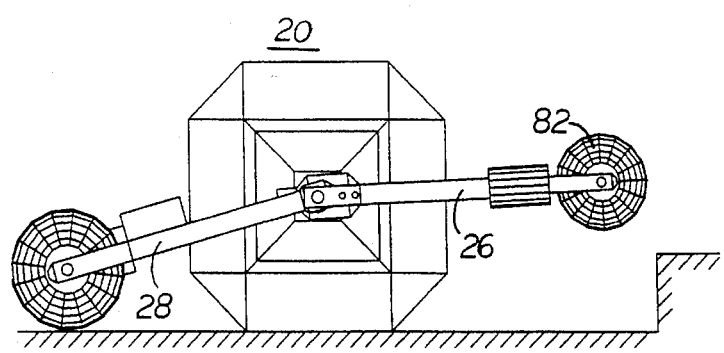
FIGS. 9A, 9B and 9C are side views of a simplified rendering of the robot body maneuvering a step obstacle.
Figure 9B:
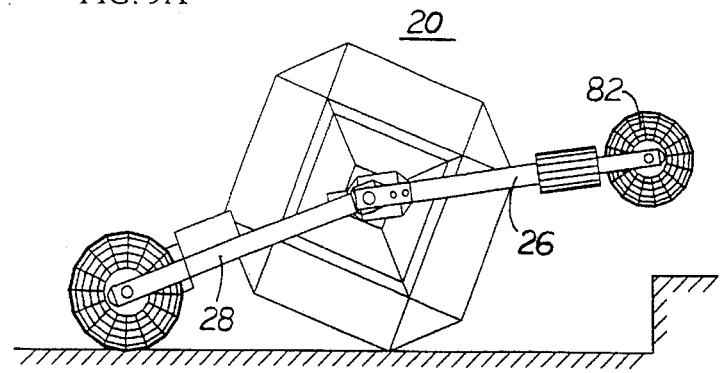
Figure 9C:
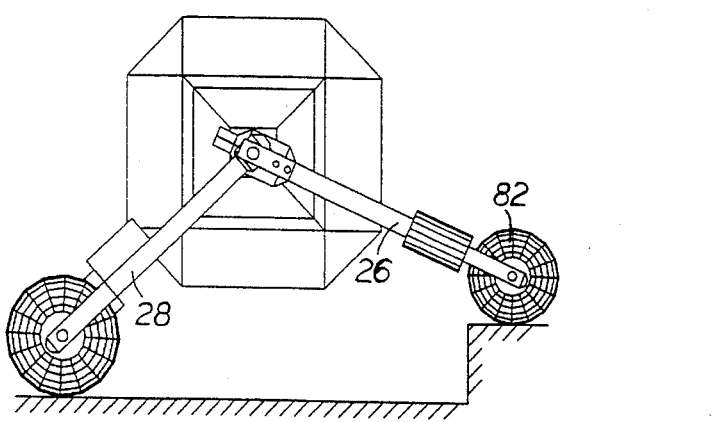

To demonstrate a case where the rhombicuboctahedron geometry can act like a crude wheel to achieve greater agility, the following example is given. The horizontal center shaft system acts like the axle to a crude wheel, the rhombicuboctahedron shaped body. Shown in FIG. 9A, the robot body 20 is positioned to maneuver a step obstacle. The turning wheels 82 are raised ready for placement on the surface of the next level. The robot body 20 is resting on the surface ready to rotate like a wheel. FIG. 9B shows the robot body 20 rotated to a new position so that the collar legs 26 are almost positioned over the next level. When the robot body 20 has rotated enough to position the turning wheels 82 over the next level they can be lowered onto the next level so that all four legs 26,28 are supporting the robot body 20 as in FIG. 9C. The robot body 20 can now move forward in the normal fashion until the inner shaft legs 28 meet the edge. A similar procedure is used to get the inner shaft legs 28 up. The inner shaft legs 28 are rotated up so that the robot body 20 is resting on the higher level and is positioned to roll forward far enough to get the inner shaft legs 28 over the edge so the inner shaft legs 28 can be lowered to support the robot body 20 for normal locomotion. In the preferred embodiment the inner shaft legs 28 have more mass than the collar legs 26, so they may need to be rotated up over the top of the robot body 20 to give better stability to the robot body 20 while the robot body 20 is rolling. A similar approach is used to maneuver down from the step type obstacles.

Figure 10A:
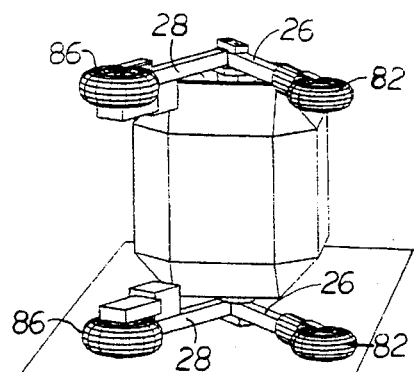
FIG. 10A is a perspective view of a simplified rendering of the robot body laying on its side after tipping over.
Figure 10B:
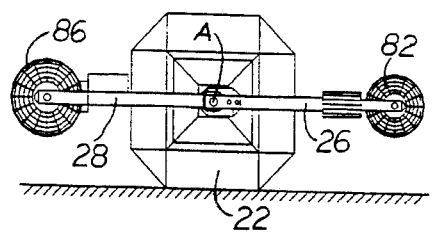
FIG. 10B is a side view of a simplified rendering of the robot body having rolled from the position in FIG. 10A to a new position on the surface of a quarter-shell module.
Figure 11:
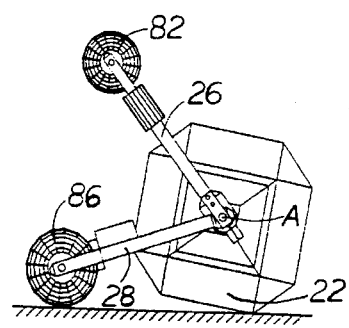
FIG. 11 is a side view of a simplified rendering of the robot body laying on a quarter-shell surface after tipping over.

The horizontal center shaft system in conjunction with the rhombicuboctahedron geometry can also make it possible for the robot body 20 to get back up on its wheels if it tips over. The shape of the robot body 20 is such that there are only two possible outcomes if the robot body 20 falls over. The robot body 20 will fall either on its side because the legs 26, 28 provide a stable resting position as in FIG. 10A, or on one of the surfaces of a quarter-shell module 22 which are parallel to the horizontal center axis A, as in FIG. 11. If the robot body 20 is in the position as in FIG. 10A, then it takes two steps to get the robot body 20 on its wheels 82, 86. Step one is to rotate the legs 26, 28 so that they extend out near 180 degrees to each other. This will produce an unstable position and the robot body 20 will roll to a position as in FIG. 10B in which it rests on a face parallel to the horizontal center axis A, similar to the case in FIG. 11. The second step required to get the robot body 20 back on its wheels 82, 86 is to rotate the legs 26, 28 toward the surface so that they support the robot body 20 again, as the robot body 20 was before it tipped over. If the robot body 20 is in the position as in FIG. 11, then it takes one step to get the robot body 20 on its wheels 82, 86. Rotating the legs 26 that are off the surface all the way over the robot body 20 to the other side of the robot body 20, until the robot body 20 is supported by the wheels 82, 86 will be all that is required. The robot body 20 is really up-side-down now, but it is on its wheels and able to move again. An adjustment will need to be made in locomotion control however, because forward is now reverse and vice versa.

Figure 12A:
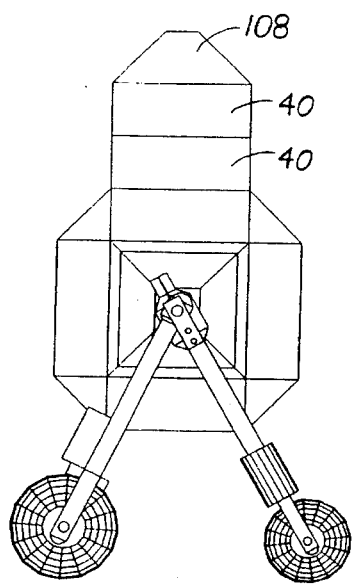
FIG. 12A is a side view of a simplified rendering of the robot body with two large trunk segments and trunk cap attached, rotated to the top position.
Figure 12B:
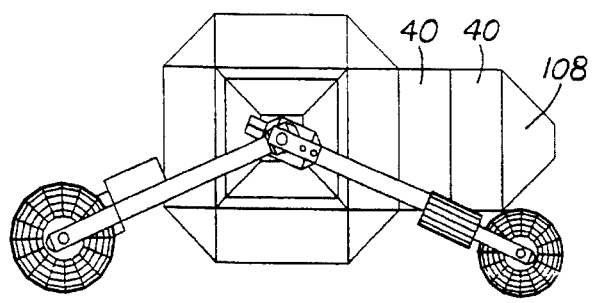
FIG. 12B is a side view of a simplified rendering of the robot body with two large trunk segments and trunk cap attached, rotated to the side position.
Figure 12C:
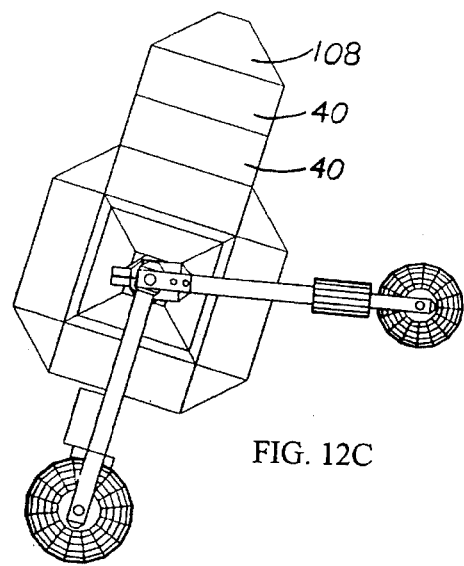
FIG. 12C is a side view of a simplified rendering of the robot body with two large trunk segments and trunk cap attached, rotated to a forty five degree angle position.

If large trunk segments 40 and segment cap 108 are added to the robot body 20 it can be shown that the horizontal center shaft system, in conjunction with the rhombicuboctahedron geometry, provides increased agility to this structure as well. The large trunk segments 40 can be rotated to the top position and wheel base made close together as in FIG. 12A to increase height, rotated to the side to maneuver under obstacles as in FIG. 12B, or rotated to the side and wheel base widened as in FIG. 12C to lower and shift the center of gravity for such surfaces as hills.

Figure 13A:
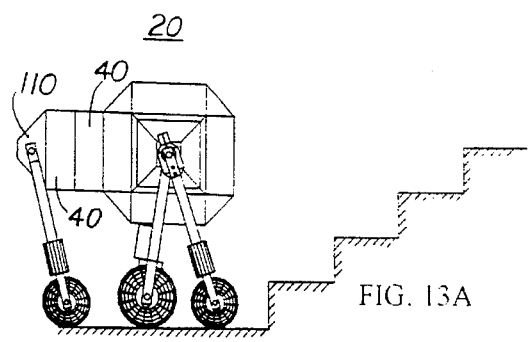
FIGS. 13A, 13B, 13C, 13D, 13E, 13F, 13G, 13H, 13I, 13J, 13K, 13L, 13M, 13N, and 13O are side views of a simplified rendering of an embodiment of the invention which demonstrates the ability to climb stairs.
Figure 13B:
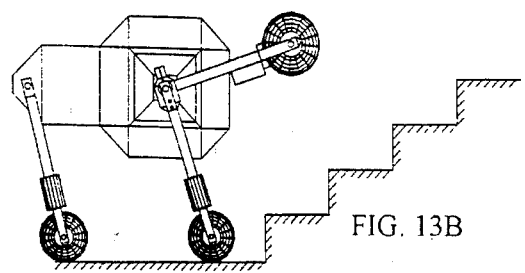
Figure 13C:
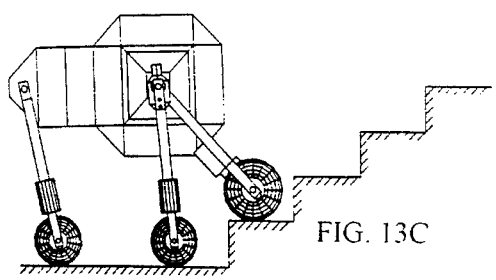
Figure 13D:
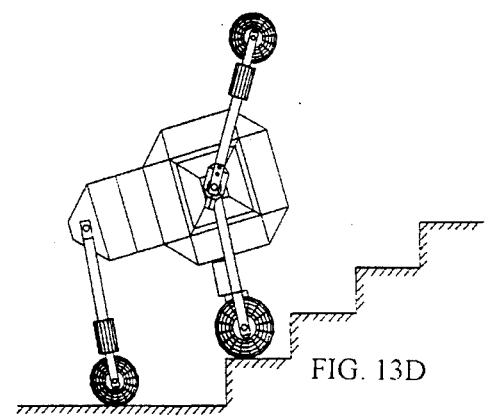
Figure 13E:
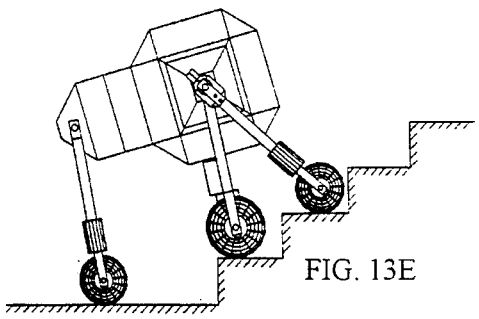
Figure 13F:
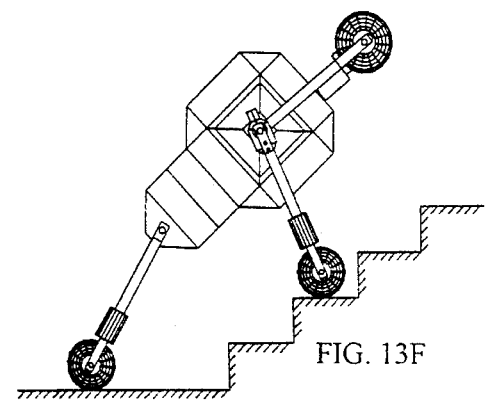
Figure 13G:
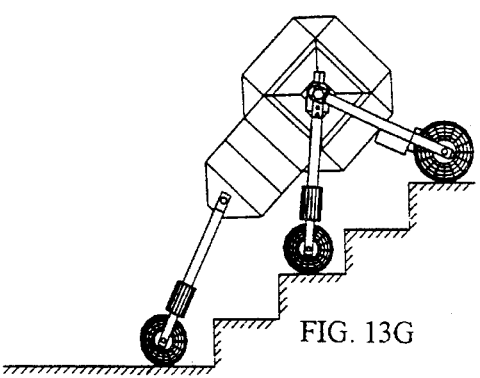
Figure 13H:
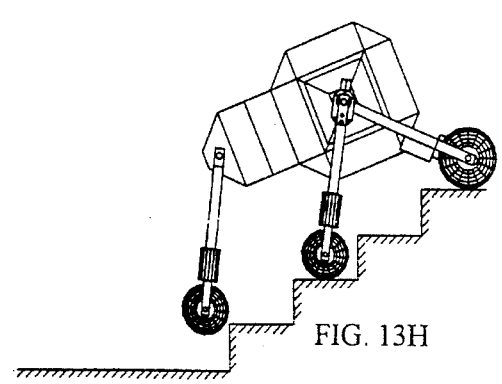
Figure 13I:
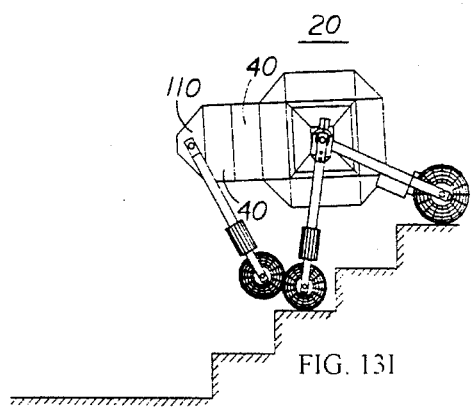
Figure 13J:
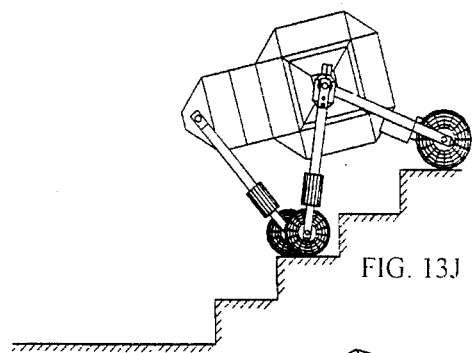
Figure 13K:
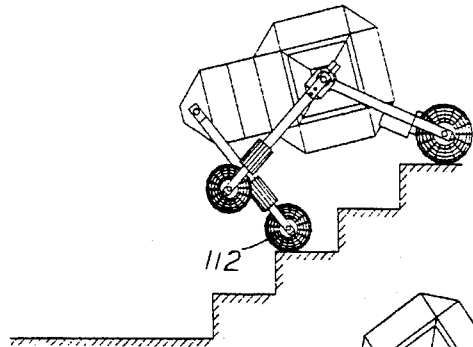
Figure 13L:
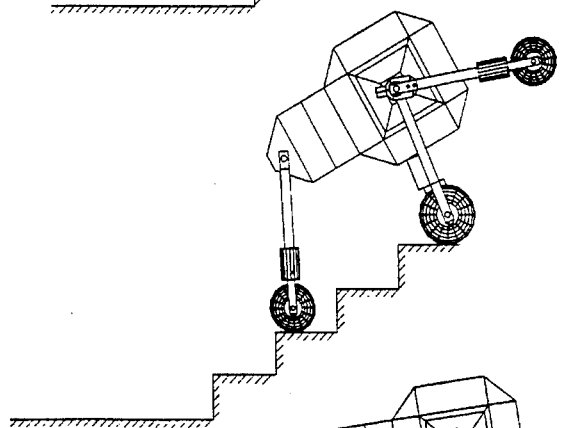
Figure 13M:
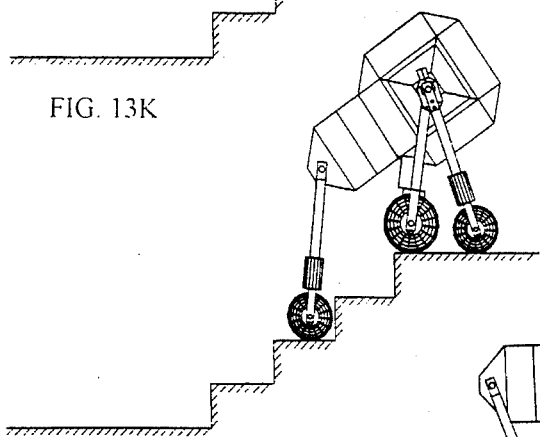
Figure 13N:
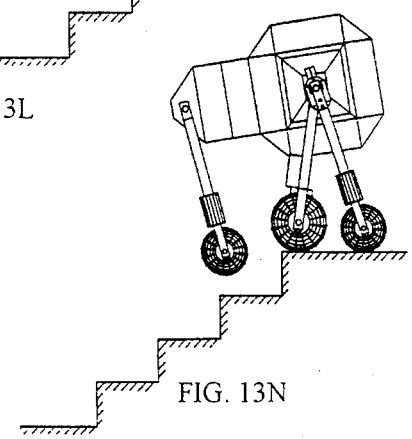
Figure 13O:
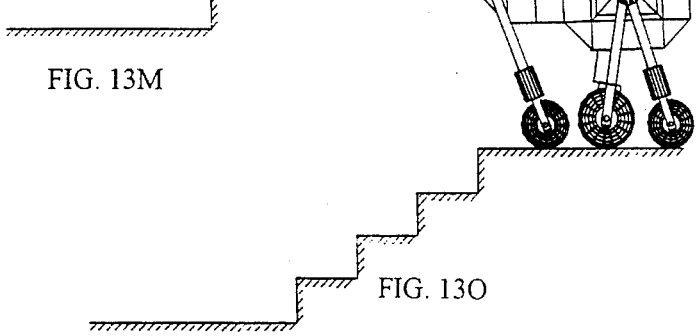

Another possible arrangement which takes advantage of the horizontal center shaft system in conjunction with the rhombicuboctahedron geometry is shown in FIGS. 13A–13O. The addition of large trunk segments 40 and segment cap with legs 110 to the robot body 20 makes it possible for the combination of modules to climb stairs. This also requires slipring substitution for the flexible coil conduit 41, referred to FIGS. 4A and 4B, in order to allow a generally large number of rotations of the inner shaft 44 without the constraint that the flexible coil conduit 41 produces. Referring now to FIG. 13A to 13O, it is important to note that the location of the center of gravity of the combination of modules is critical for this procedure to work. The combination of modules is required to go up the stairs backwards so the center of gravity is always positioned between two sets of legs. It also is an advantage to have the quarter-shell with the batteries positioned opposite the quarter-shell that has the trunk segments attached, as this will allow the center of gravity of the robot to be shifted more toward the stairs. This is an advantage in positions on the stairs such as that in FIG. 13K where a good portion of the mass of the combination of modules is over the leg cap wheels 112. If a major portion of the mass of the combination of modules is allowed to get too far over the leg cap wheels 112, the combination of modules will lose balance and fall down the steps. By viewing FIG. 13A through FIG. 13O in reverse order it is possible to see how the combination of modules would go down the steps.

Figure 14A:
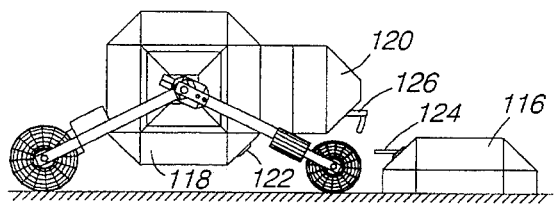
FIGS. 14A, 14B, 14C, and 14D are side views of a simplified rendering of au embodiment of the invention which demonstrates the ability to mate with an implement module.
Figure 14B:
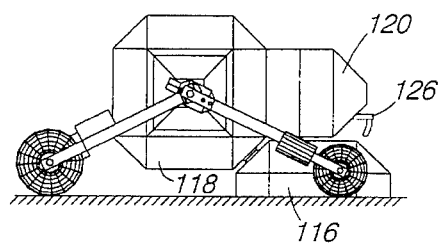
Figure 14C:
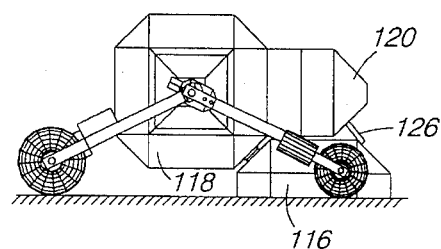
Figure 14D:
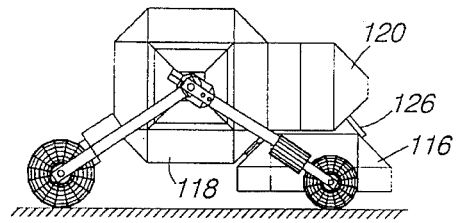

The horizontal center shaft system also provides a means of adjusting body height and angle to make alignment possible to an implement module 116. FIGS. 14A–14D show how a mating quarter-shell module 118 and mating segment cap 120 work to connect with a implement module 116 that can be connected and disconnected easily for temporary use. Implement modules may be designed for such things as vacuum cleaning, lawn mowing, floor sweeping, and floor polishing, or any other job that is applicable. The mating quarter-shell module 118 and implement module 116 are designed such that the mating quarter-shell module 118 accepts into two receptacles 122 (one shown) two rods 124 (not shown), mounted on the implement module 116. The rods 124 and receptacles 122 are made of conductive material mounted on non-conductive material to provide a way of supplying electrical power to the implement module 116 from the mating quarter-shell module 118, and are strong and rigid enough to support one side of the implement module 116. FIG. 14A shows the robot adjusted ready to link with the implement module 116. FIG. 14B shows the rods 124 of the implement module 116 fully in the receptacle 122 of the mating quarter-shell module 118. FIG. 14C shows a locking hook 126 on the mating segment cap 120 locked to hold the implement module 116 with the robot. FIG. 14D shows the robot after lifting the implement module 116 up ready for use.

SUMMARY, RAMIFICATIONS, AND SCOPE

All of the above presented examples show the versatility and agility provided to the robot by the modular rhombicuboctahedron construction combined with the horizontal center shaft system, and are presented as examples of just some of the possibilities of the present invention.

Although the present invention has been described in terms of the presently preferred embodiment, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

I claim:

1. A robot body, comprising:
   an elongated rectangular core module having four rectangular sides and two opposite square ends, each of said ends having four edges, said core module having a longitudinal axis extending between said ends; and
   four panels attached to said core module, said panels being arranged radially around said axis, each of said panels including a rectangular side parallelly spaced from one of said sides of said core module, said rectangular side of said panel having two longitudinal edges parallel to said axis and two transverse edges orthogonal to said axis, said rectangular side of said panel being longitudinally shorter than said side of said core module, each of said panels including first and second rectangular angled sides extending from said transverse edges to adjacent edges along said ends of said core module, each of said panels including a third rectangular angled side extending from one of said longitudinal edges to an adjacent longitudinal edge of said rectangular side of an adjacent panel, each of said panels including two triangular sides extending between opposite ends of said third rectangular angled side and adjacent ends of said first and second rectangular angled sides.

2. The robot body of claim 1, further including a rim extending around each of said panels, and a plurality of holes arranged around said rim, so that said rims of adjoining panels are in abutting relations and said holes on abutting rims are aligned together, said holes being adapted to receive screws for attaching said panels together.

3. The robot body of claim 1, further including a plurality of bumpers positioned along adjoining sides of said panels.

4. A robot, comprising:
   a core module;
   only one pair of front legs having proximal ends pivotally attached to said core module and angling downwardly and forwardly therefrom, said front legs being pivoted about an axis at said proximal ends;
   only one pair of rear legs having proximal ends pivotally attached to said core module and angling downwardly and rearwardly therefrom, said rear legs being pivoted about said axis at said proximal ends, said front and rear legs supporting said core module at a predetermined height above a surface;
   a pair of non-driven wheels attached to respective distal ends of said from legs;
   a pair of driven wheels attached to respective distal ends of said rear legs;
   rotating means for independently rotating each of said pairs of legs about said axis with respect to said core module, so that when said pairs of legs are rotated in opposite directions with respect to said core module, said height of said core module is changed, and when said pairs of legs are rotated in the same direction with respect to said core module, said core module is rotated about said axis; and
   driving means for driving said driven wheels comprising a pair of drive motors mounted on respective rear legs.

5. The robot of claim 4 wherein said rotating means comprises a pair of concentric shafts positioned along said axis, one of said shafts being hollow for receiving the other shaft, each of said shafts being driven by motor means for rotation about said axis, one of said shafts having one end rigidly attached to one of said front legs for rotating said one of said front legs, the other shaft having one end rigidly attached to one of said rear legs for rotating said one of said rear legs.

6. The robot of claim 4, further including a flexible coil conduit coiled around said shafts and connected to said drive motors.

7. A robot, comprising:
   an elongated rectangular core module having four rectangular sides and two opposite square ends, each of said ends having four edges, said core module having a longitudinal axis extending between said ends;
   four panels attached to said core module, said panels being arranged radially around said axis, each of said panels including a rectangular side parallelly spaced from one of said sides of said core module, said rectangular side of said panel having two longitudinal edges parallel to said axis and two transverse edges orthogonal to said axis, said rectangular side of said panel being longitudinally shorter than said side of said core module, each of said panels including first and second rectangular angled sides extending from said transverse edges to adjacent edges along said ends of said core module, each of said panels including a third rectangular angled side extending from one of said longitudinal edges to an adjacent longitudinal edge of said rectangular side of an adjacent panel, each of said panels including two triangular sides extending between opposite ends of said third rectangular angled side and adjacent ends of said first and second rectangular angled sides;
   only one pair of front legs having proximal ends pivotally attached to said ends of said core module and angling downwardly and forwardly therefrom, said front legs being pivoted about said axis at said proximal ends;
   only one pair of rear legs having proximal ends pivotally attached to said ends of said core module and angling downwardly and rearwardly therefrom, said rear legs being pivoted about said axis at said proximal ends, said from and rear legs supporting said core module at a predetermined height above a surface;

a pair of non-driven wheels attached to respective distal ends of said front legs;

a pair of driven wheels attached to respective distal ends of said rear legs;

rotating means for independently rotating each of said pairs of legs about said axis with respect to said core module, so that when said pairs of legs are rotated in opposite directions with respect to said core module, said height of said core module is changed, and when said pairs of legs are rotated in the same direction with respect to said core module, said core module is rotated about said axis; and driving means for driving said driven wheels.

8. The robot of claim 7, further including a rim extending around each of said panels, and a plurality of holes arranged around said rim, so that said rims of adjoining panels are in abutting relations and said holes on abutting rims are aligned together, said holes being adapted to receive screws for attaching said panels together.

9. The robot of claim 7 wherein said rotating means comprises a pair of concentric shafts positioned along said axis, one of said shafts being hollow for receiving the other shaft, each of said shafts being driven by motor means for rotation about said axis, one of said shafts having one end rigidly attached to one of said front legs for rotating said one of said front legs, the other shaft having one end rigidly attached to one of said rear legs for rotating said one of said rear legs.

10. The robot of claim 7 wherein said driving means comprises a pair of drive motors attached to said rear legs for driving said driven wheels.

11. The robot of claim 10, further including a flexible coil conduit coiled around said shafts and connected to said drive motors.

12. The robot of claim 7, further including a plurality of bumpers positioned along adjoining sides of said panels.

\* \* \* \* \*